(12) United States Patent
Chopko et al.

(10) Patent No.: US 10,823,476 B2
(45) Date of Patent: Nov. 3, 2020

(54) ENGINELESS TRANSPORT REFRIGERATION UNIT

(71) Applicant: Carrier Corporation, Palm Beach Gardens, FL (US)

(72) Inventors: Robert A. Chopko, Baldwinsville, NY (US); Yu H. Chen, Manlius, NY (US); Greg Deldicque, Fayetteville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 55 days.

(21) Appl. No.: 16/091,847

(22) PCT Filed: Apr. 4, 2017

(86) PCT No.: PCT/US2017/025907
§ 371 (c)(1),
(2) Date: Oct. 5, 2018

(87) PCT Pub. No.: WO2017/176725
PCT Pub. Date: Oct. 12, 2017

(65) Prior Publication Data
US 2019/0086138 A1 Mar. 21, 2019

Related U.S. Application Data

(60) Provisional application No. 62/318,381, filed on Apr. 5, 2016.

(51) Int. Cl.
*F25D 11/00* (2006.01)
*B60H 1/32* (2006.01)
(Continued)

(52) U.S. Cl.
CPC ......... *F25D 11/003* (2013.01); *B60H 1/3222* (2013.01); *B60H 1/3232* (2013.01);
(Continued)

(58) Field of Classification Search
CPC ... F25D 11/003; B60H 1/3222; B60H 1/3232; F25B 27/002
See application file for complete search history.

(56) References Cited

U.S. PATENT DOCUMENTS 6,082,122 A * 7/2000 Madenokouji ....... G01D 18/008
62/77
6,755,041 B2 6/2004 Wessells et al.
(Continued)

FOREIGN PATENT DOCUMENTS

CN 203402039 U 1/2014
EP 1512565 A1 3/2005
(Continued)

OTHER PUBLICATIONS

Anonymous, "Solar Powered Refrigerated Trucks India—Solar Refrigeration System India for Solar Refrigerated Truck for Transportation of Fresh Fish, Frozen Food," Aug. 25, 2015 (Aug. 25, 2015) [retrieved on Jul. 4, 2017 (Jul. 4, 2017)]. Retrieved from the internet URL: http://www.bharatsolarenergy.com/1378-solar-powered-refrigerated-trucks-india-/details.html.
(Continued)

*Primary Examiner* — Nelson J Nieves
(74) *Attorney, Agent, or Firm* — Cantor Colburn LLP

(57) ABSTRACT

An engineless transport refrigeration unit includes a compressor constructed and arranged to compress a refrigerant, and a compressor motor configured to drive the compressor and operate at a voltage range of two hundred (200) to six hundred (600) volts. A battery of the engineless transport refrigeration unit provides the power to the compressor motor.

3 Claims, 3 Drawing Sheets

(51) Int. Cl.
*F25B 27/00* (2006.01)
*F25D 19/00* (2006.01)
*F25D 29/00* (2006.01)
*F25D 19/04* (2006.01)

(52) U.S. Cl.
CPC ............ *F25B 27/00* (2013.01); *F25D 19/003* (2013.01); *F25D 19/04* (2013.01); *F25D 29/003* (2013.01)

(56) References Cited

U.S. PATENT DOCUMENTS

| | | | |
|---|---|---|---|
| 7,878,013 B2 | 2/2011 | Matsuno et al. | |
| 8,397,528 B2* | 3/2013 | Awwad | F25B 41/062 62/225 |
| 2002/0108388 A1 | 8/2002 | Wilson et al. | |
| 2002/0108389 A1 | 8/2002 | Chopko et al. | |
| 2004/0079098 A1* | 4/2004 | Uno | B60H 1/322 62/236 |
| 2006/0145654 A1 | 7/2006 | Douglas | |
| 2007/0199338 A1* | 8/2007 | Evans | B60H 1/3213 62/228.4 |
| 2008/0078193 A1* | 4/2008 | Lin | B60H 1/00428 62/235.1 |
| 2008/0078195 A1* | 4/2008 | Lin | B60H 1/00428 62/235.1 |
| 2008/0257622 A1* | 10/2008 | Teschner | B60H 1/004 180/65.29 |
| 2009/0211280 A1* | 8/2009 | Alston | B60H 1/00428 62/231 |
| 2010/0000241 A1 | 1/2010 | Kitano et al. | |
| 2010/0107661 A1* | 5/2010 | Awwad | B60H 1/321 62/80 |
| 2011/0030399 A1 | 2/2011 | Lifson et al. | |
| 2012/0090342 A1* | 4/2012 | Ikemiya | B60P 3/20 62/239 |
| 2012/0096885 A1* | 4/2012 | Mak | B60K 16/00 62/235.1 |
| 2012/0318014 A1* | 12/2012 | Huff | F25B 1/10 62/228.1 |
| 2012/0319472 A1 | 12/2012 | Arnold | |
| 2013/0084790 A1* | 4/2013 | Furuse | B60H 1/3204 454/75 |
| 2014/0374060 A1* | 12/2014 | Labaste Mauhe | B60H 1/00278 165/62 |
| 2015/0168032 A1 | 6/2015 | Steele et al. | |
| 2015/0188323 A1 | 7/2015 | Muralidhar et al. | |
| 2015/0246593 A1* | 9/2015 | Larson | B60H 1/00014 62/56 |
| 2015/0360568 A1* | 12/2015 | Champagne | B60L 1/02 296/156 |
| 2016/0090054 A1* | 3/2016 | Powell | B60H 1/3232 307/9.1 |
| 2016/0334142 A1* | 11/2016 | Senf, Jr. | F25B 5/02 |
| 2016/0377338 A1* | 12/2016 | Tanaka | A23L 3/3418 62/189 |
| 2017/0008407 A1* | 1/2017 | Porras | B60H 1/00921 |
| 2017/0108263 A1* | 4/2017 | Cermak | F25B 7/00 |
| 2017/0197492 A1* | 7/2017 | Ishizeki | B60H 1/32 |
| 2017/0291474 A1* | 10/2017 | Guo | B60R 16/033 |
| 2018/0038625 A1* | 2/2018 | Yokohara | F25D 17/045 |
| 2018/0087813 A1* | 3/2018 | Senf, Jr. | B60H 1/3223 |
| 2018/0222278 A1* | 8/2018 | Mizuma | F25B 27/00 |

FOREIGN PATENT DOCUMENTS

| | | |
|---|---|---|
| EP | 2128545 A1 | 10/2013 |
| JP | 2010181126 A | 8/2010 |

OTHER PUBLICATIONS

Ecozen, "Ecofrost-Solar Cold Storage-Ecozen," Nov. 14, 2015 (Nov. 14, 2015) [retrieved on Jul. 5, 2017 Jul. 5, 2017)]. Retrieved from the internet URL: https://www.youtube.com/watch?v=K8I8X17lk44#t=12.833813.

ISR/WO, Issued Jul. 14, 2017 for related International Publication No. WO2017/176725A1; 13 pages.

Joenito Soon, "Advanced Solar Panel for Reefer Container | Joenito Soon | Pulse | LinkedIn," Jul. 24, 2015 (Jul. 24, 2015) [retrieved Jul. 4, 2017 (Jul. 4, 2017)]. Retrieved from the internet URL: https://www.linkedin.com/pulse/advanced-solar-panel-reefer-container-joenito-soon.

Joey Chou, "Solar Power Refrigerated Container," May 6, 2014 (May 6, 2014) [retrieved on Jul. 5, 2017 (Jul. 5, 2017)]. Retrieved from the internet URL: https://www.youtube.com/watch?v=r_LkYE911QE.

Tom Berg, "Future Reefers," Dec. 2012 (Dec. 2012) [retrieved on Jan. 7, 2016 (Dec. 7, 2016)]. Retrieved from the internet;http://www.truckinginfo.com/article/story/2013/01/future-reefers.aspx.

\* cited by examiner

ENGINELESS TRANSPORT REFRIGERATION UNIT

CROSS-REFERENCE TO RELATED APPLICATIONS

This application claims the benefit of PCT/US2017/025907 filed Apr. 4, 2017, which claims priority to U.S. Provisional Application No. 62/318,381 filed Apr. 5, 2016, which is incorporated herein by reference in its entirety.

BACKGROUND

The present disclosure relates to transport refrigeration units and, more particularly, to engineless transport refrigeration units.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

With current environmental trends, improvements in transport refrigeration units are desirable particularly toward aspects of environmental impact. With environmentally friendly refrigeration units, improvements in reliability, cost, and weight reduction is also desirable.

SUMMARY

An engineless transport refrigeration unit according to one, non-limiting, embodiment of the present disclosure includes a compressor constructed and arranged to compress a refrigerant; a compressor motor configured to drive the compressor and operate at a voltage range of two hundred to six hundred volts; and a battery for providing power to the compressor motor.

In addition to the foregoing embodiment, the power is direct current and the compressor motor is a direct current compressor motor.

In the alternative or in additionally thereto, in the foregoing embodiment, the engineless transport refrigeration unit includes a condenser heat exchanger operatively coupled to the compressor; a condenser fan configured to provide air flow over the condenser heat exchanger; and an electric condenser fan motor for driving the condenser fan.

In the alternative or in additionally thereto, in the foregoing embodiment, the electric condenser fan motor is a direct current condenser fan motor.

In the alternative or in additionally thereto, in the foregoing embodiment, the engineless transport refrigeration unit includes an evaporator heat exchanger operatively coupled to the compressor; an evaporator fan configured to provide air flow over the evaporator heat exchanger; and an electric evaporator fan motor for driving the evaporator fan.

In the alternative or in additionally thereto, in the foregoing embodiment, the electric evaporator fan motor is a direct current evaporator fan motor.

In the alternative or in additionally thereto, in the foregoing embodiment, the engineless transport refrigeration unit includes an evaporator heat exchanger operatively coupled to the compressor; an evaporator fan configured to provide air flow over the evaporator heat exchanger; and an electric evaporator fan motor for driving the evaporator fan.

In the alternative or in additionally thereto, in the foregoing embodiment, the electric evaporator fan motor is a direct current evaporator fan motor.

In the alternative or in additionally thereto, in the foregoing embodiment, the refrigerant is a natural refrigerant.

In the alternative or in additionally thereto, in the foregoing embodiment, the natural refrigerant is carbon dioxide.

In the alternative or in additionally thereto, in the foregoing embodiment, the refrigerant includes a GWP of about one.

In the alternative or in additionally thereto, in the foregoing embodiment, the engineless refrigeration unit includes an on-board battery recharger configured to supply recharge power to the battery from an alternating current, remote, source.

In the alternative or in additionally thereto, in the foregoing embodiment, the engineless refrigeration unit includes a renewable power source configured to recharge the battery.

In the alternative or in additionally thereto, in the foregoing embodiment, the renewable power source is a solar panel.

In the alternative or in additionally thereto, in the foregoing embodiment, the renewable power source is regenerative braking.

An engineless transport refrigeration unit according to another, non-limiting, embodiment includes a compressor constructed and arranged to compress a natural refrigerant having a GWP of about one; a compressor motor configured to drive the compressor; a condenser heat exchanger operatively coupled to the compressor; a condenser fan configured to provide air flow over the condenser heat exchanger; and a condenser fan motor for driving the condenser fan;

Additionally to the foregoing embodiment, the engineless transport refrigeration unit includes an evaporator heat exchanger operatively coupled to the compressor; an evaporator fan configured to provide air flow over the evaporator heat exchanger; an evaporator fan motor for driving the evaporator fan; and an energy storage device configured to provide direct current electric power to the compressor, condenser and evaporator fan motors.

A tractor trailer system according to another, non-limiting, embodiment includes a self-propelled tractor including a combustion engine and a generator driven by the combustion engine; a transport container adapted to be connected and towed by the self-propelled tractor; and an engineless transport refrigeration unit mounted on the transport container, the engineless transport refrigeration unit comprising a compressor constructed and arranged to compress a natural refrigerant having a GWP of about one, a compressor motor configured to drive the compressor, a condenser heat exchanger operatively coupled to the compressor, a condenser fan configured to provide air flow over the condenser heat exchanger, a condenser fan motor for driving the condenser fan, an evaporator heat exchanger operatively coupled to the compressor, an evaporator fan configured to provide air flow over the evaporator heat exchanger, an evaporator fan motor for driving the evaporator fan, and an energy storage device configured to provide direct current electric power to the compressor, condenser and evaporator fan motors, and wherein the energy storage device is configured to be recharged by the generator.

Additionally to the foregoing embodiment, the energy storage device is a battery.

In the alternative or in additionally thereto, in the foregoing embodiment, the engineless transport refrigeration unit includes a renewable source of power configured to recharge the battery.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
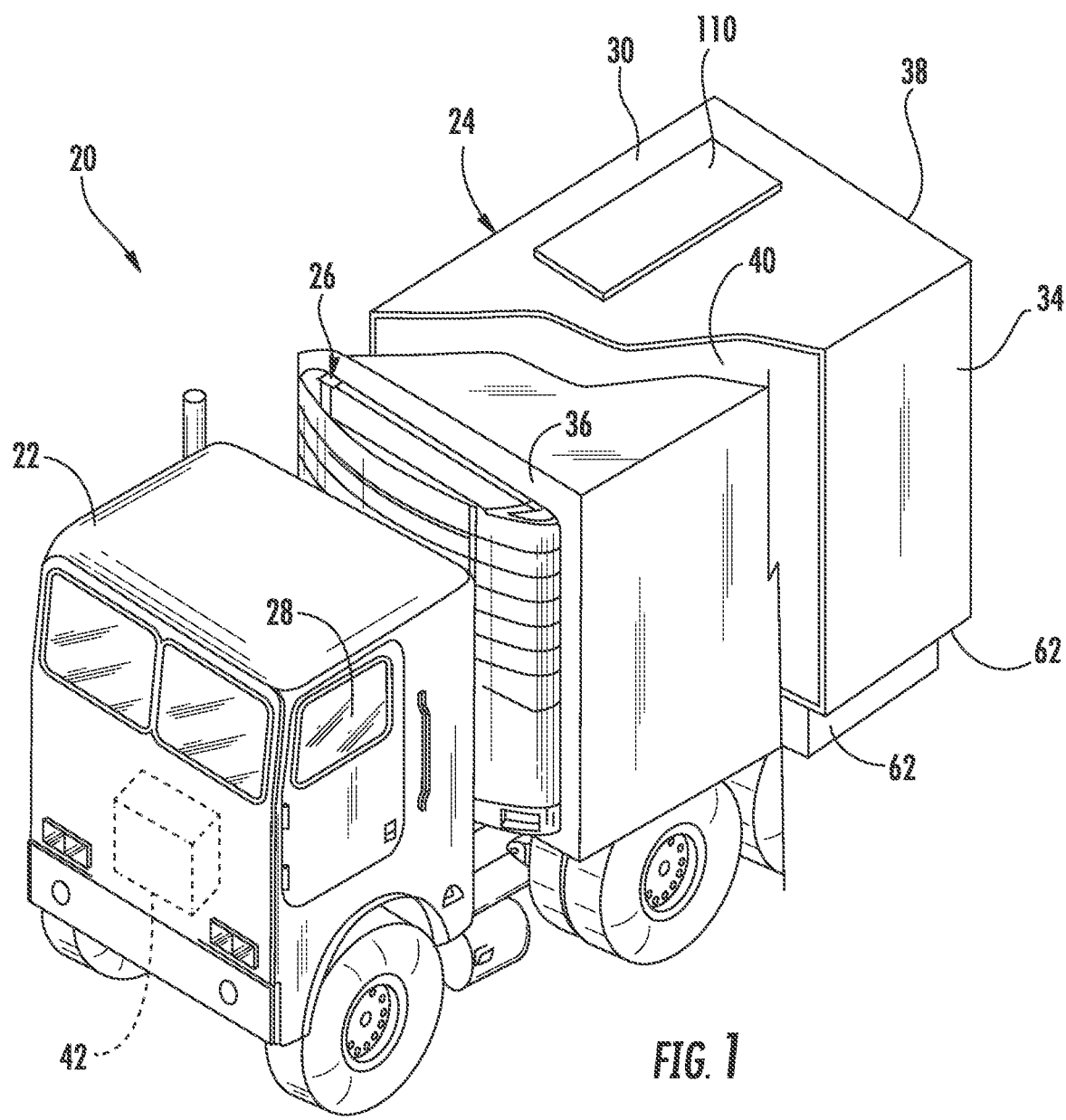
FIG. 1 is a perspective view of a tractor trailer system having an engineless transport refrigeration unit as one, non-limiting, embodiment of the present disclosure.

Referring to FIG. 1, a tractor trailer system 20 of the present disclosure is illustrated. The tractor trailer system 20 may include a tractor or truck 22, a trailer 24 and an engineless transport refrigeration unit 26. The tractor 22 may include an operator's compartment or cab 28 and a combustion engine 42 which is part of the powertrain or drive system of the tractor 22. The trailer 24 may be coupled to the tractor 22 and is thus pulled or propelled to desired destinations. The trailer may include a top wall 30, a bottom wall 32 opposed to and space from the top wall 30, two side walls 34 space from and opposed to one-another, and opposing front and rear walls 36, 38 with the front wall 36 being closest to the tractor 22. The trailer 24 may further include doors (not shown) at the rear wall 38, or any other wall. The walls 30, 32, 34, 36, 38 together define the boundaries of a cargo compartment 40.

Figure 2:
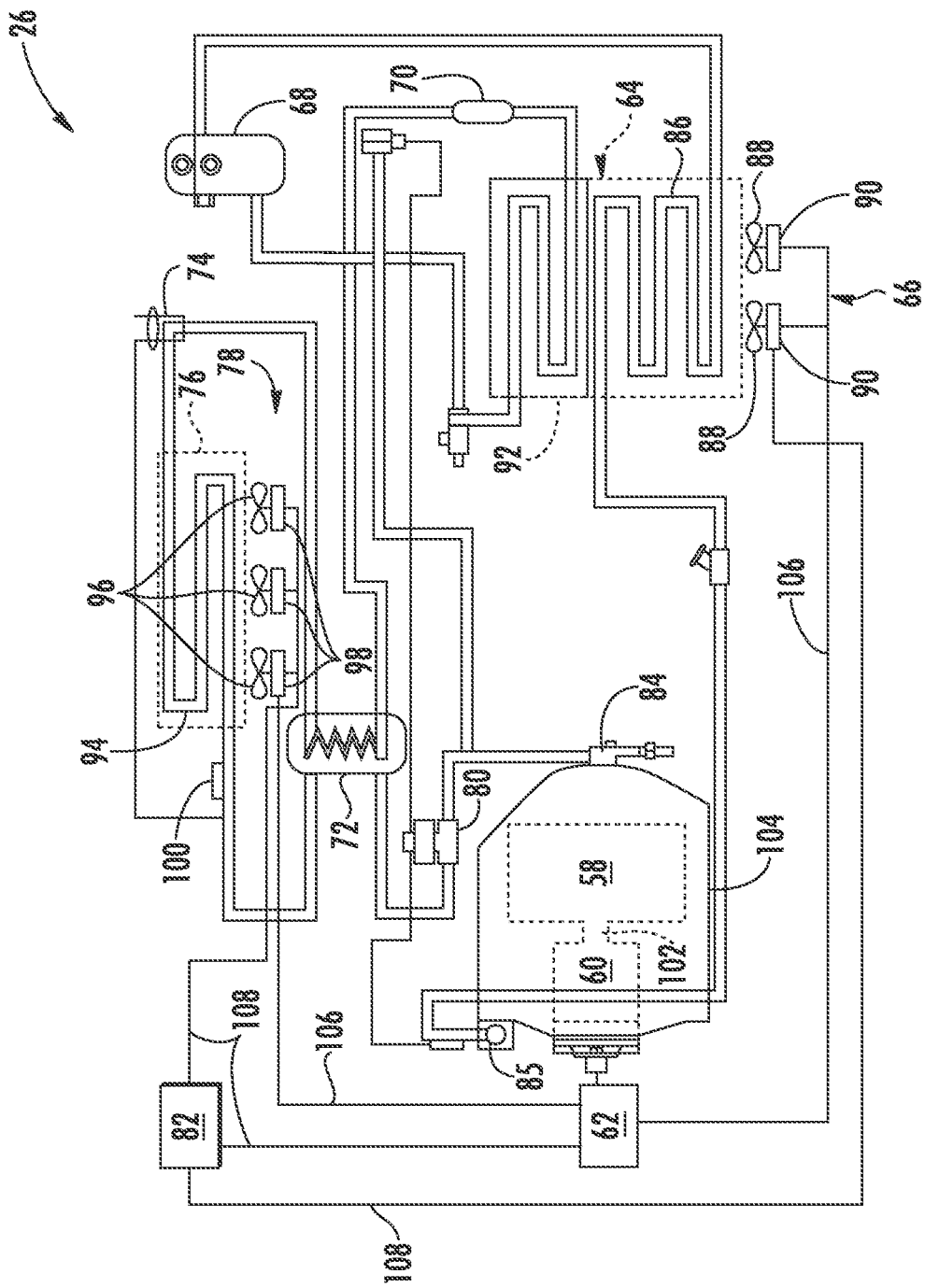
FIG. 2 is a schematic of the engineless transport refrigeration unit.

Referring to FIGS. 1 and 2, the trailer 24 is generally constructed to store a cargo (not shown) in the compartment 40. The engineless transport refrigeration unit 26 is generally integrated into the trailer 24 and may be mounted to the front wall 36. The cargo is maintained at a desired temperature by cooling of the compartment 40 via the refrigeration unit 26 that circulates airflow into and through the cargo compartment 40 of the trailer 24. It is further contemplated and understood that the refrigeration unit 26 may be applied to any transport compartments (e.g. shipping or transport containers) and not necessarily those used in tractor trailer systems. Furthermore, the transport container may be a part of the trailer 24 and constructed to be removed from a framework and wheels (not shown) of the trailer 24 for alternative shipping means (e.g., marine, railroad, flight, and others).

The components of the engineless transport refrigeration unit 26 may include a compressor 58, an electric compressor motor 60, an electric energy storage device 62, a condenser 64 that may be air cooled, a condenser fan assembly 66, a receiver 68, a filter dryer 70, a heat exchanger 72, a thermostatic expansion valve 74, an evaporator 76, an evaporator fan assembly 78, a suction modulation valve 80, and a controller 82 that may include a computer-based processor (e.g., microprocessor). Operation of the engineless transport refrigeration unit 26 may best be understood by starting at the compressor 58, where the suction gas (i.e., natural refrigerant) enters the compressor at a suction port 84 and is compressed to a higher temperature and pressure. The refrigerant gas is emitted from the compressor at an outlet port 86 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric.

By removing latent heat, the gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the thermostatic expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for natural refrigerants such as propane and ammonia. Other refrigerant systems may also be applied that use carbon dioxide ($CO_2$) refrigerant, and that may be a two-stage vapor compression system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress natural refrigerants. The natural refrigerant may be CO2, propane, ammonia, or any other natural refrigerant that may include a global-warming potential (GWP) of about one (1).

Figure 3:
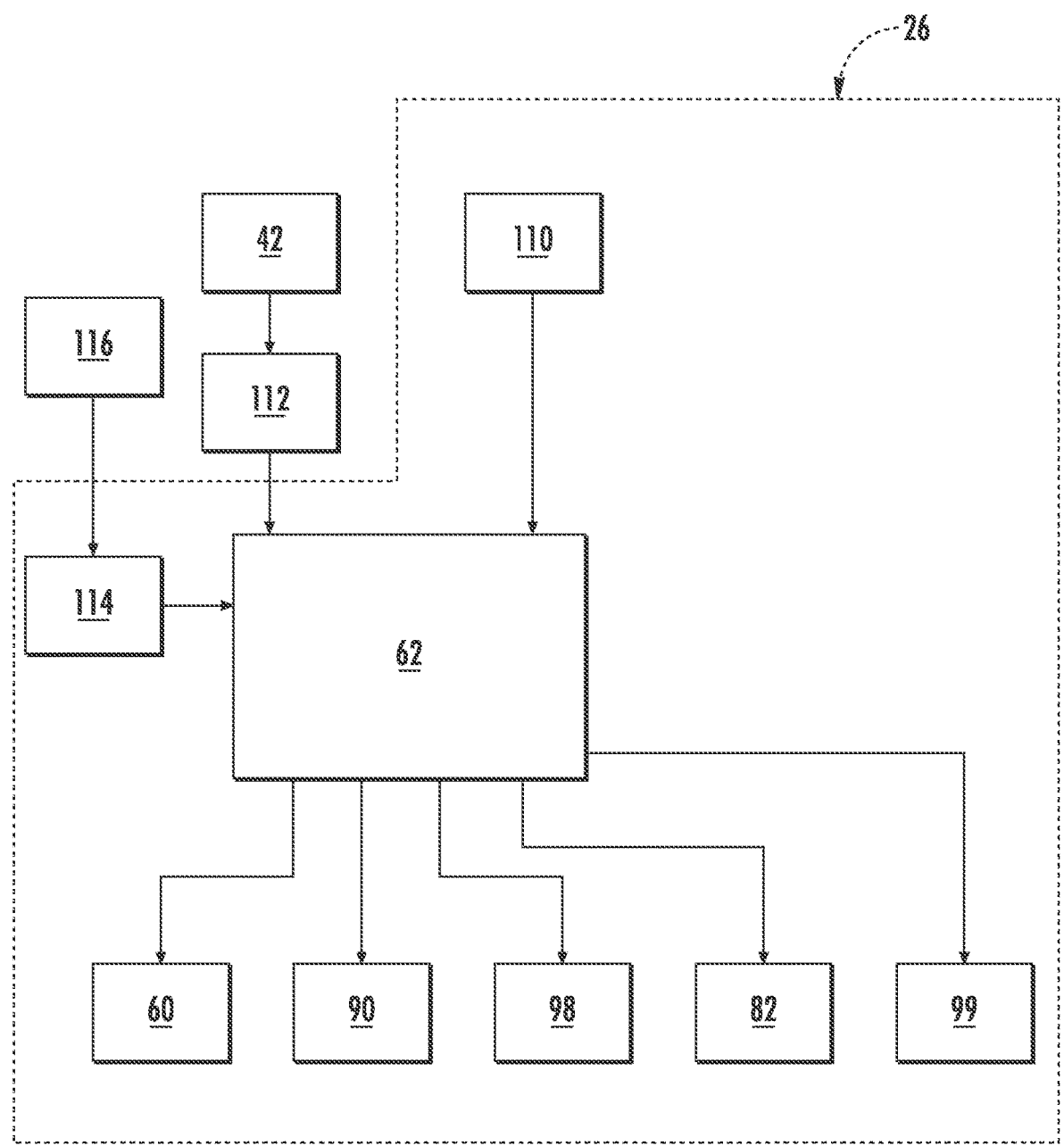
FIG. 3 is a block diagram of an energy storage device of the engineless transport refrigeration unit and sources of power recharge.

Referring to FIGS. 2 and 3, the energy storage device 62 may be configured to selectively power the compressor motor 60, the condenser fan motors 90, the evaporator fan motors 98, the controller 82, and other components 99 (see FIG. 3) that may include various solenoids and/or sensors) via, for example, electrical conductors 106. The controller 82 through a series of data and command signals over various pathways 108 may, for example, control the electric motors 60, 90, 98 as dictated by the cooling needs of the refrigeration unit 26. In one embodiment, the energy storage device 62 may be secured to the underside of the bottom wall 32 of the trailer 24 (see FIG. 1). Examples of the energy storage device 62 may include a battery (or bank of batteries), fuel cells, and others capable of storing and outputting electric energy that may be direct current (DC).

The engineless transport refrigeration unit 26 may include a DC architecture without any of the components requiring alternate current (AC), or a mechanical form of power, to operate (i.e., the motors 60, 90, 98 may be DC motors). The batteries 62 may have a voltage potential within a range of about two-hundred volts (200V) to about six-hundred volts (600V). The use of these batteries may include a step-up or step-down transformer as needed (not shown). Generally, the higher the voltage, the greater is the sustainability of electric power which is preferred. However, the higher the voltage, the greater is the size and weight of, for example, the compressor motor 60 which is not preferred when transporting cargo.

The engineless transport refrigeration unit 26 may further include a renewable power source 110 configured to recharge the batteries 62. One embodiment of a renewable power source 110 may be solar panels mounted, for example, to the outside of the top wall 30 of the trailer 24 (also see FIG. 1). Another embodiment of a renewable power source 110 may include a regenerative braking system that derives electric power from the braking action of the wheels of the tractor trailer system 20.

The combustion engine 42 of the tractor 22 may further include an alternator or generator 112 for recharging the batteries 62. Alternatively or in addition to, the engineless transport refrigeration unit 26 may include a rectifier 114 and other components that facilitate recharging of the batteries 62 from an alternating current source 116 such as, for example, a remote power station or receptacle that receives power from a public utility grid.

Benefits of the present disclosure when compared to more traditional systems include lower fuel consumption, and a refrigeration unit that emits less noise and is lighter in weight. Yet further, the present disclosure includes an energy storage device that is conveniently and efficiently recharged to meet the power demands of the refrigeration unit.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A tractor trailer system comprising:
    a self-propelled tractor including a combustion engine and a generator driven by the combustion engine;
    a transport container adapted to be connected and towed by the self-propelled tractor;
    and
    an engineless transport refrigeration unit mounted on the transport container, the engineless transport refrigeration unit comprising a compressor constructed and arranged to compress a natural refrigerant having a GWP of about one, a direct current compressor motor configured to drive the compressor, a condenser heat exchanger operatively coupled to the compressor, a condenser fan configured to provide air flow over the condenser heat exchanger, a condenser fan motor for driving the condenser fan, an evaporator heat exchanger operatively coupled to the compressor, an evaporator fan configured to provide air flow over the evaporator heat exchanger, an evaporator fan motor for driving the evaporator fan, and an energy storage device configured to provide direct current electric power to the compressor, condenser and evaporator fan motors, and wherein the energy storage device is configured to provide power within a range of two hundred volts to six hundred volts and to be recharged by the generator, and wherein the compressor motor is configured to operate at a direct current voltage range of two hundred to six hundred volts.

2. The tractor trailer system set forth in claim 1, wherein the energy storage device is a battery.

3. The tractor trailer system set forth in claim 2, wherein the engineless transport refrigeration unit includes a renewable source of power configured to recharge the battery.

* * * * *